Patented Jan. 14, 1936

2,027,467

UNITED STATES PATENT OFFICE 2,027,467

OIL DERIVATIVE

Merlin Martin Brubaker, Wilmington, Del., assignor to E. I. du Pont de Nemours & Company, Wilmington, Del., a corporation of Delaware No Drawing. Original application April 11, 1932, Serial No. 604,666. Divided and this application March 29, 1934, Serial No. 718,088

9 Claims. (Cl. 260—8)

This invention relates to hydrogenated castor oil derivatives and more particularly to those derivatives useful as softening agents for nitrocellulose films.

This case is a division of my application Serial No. 604,666 filed April 11, 1932.

This invention has as an object the production of new compounds comprising esters of a particular type of hydrogenated castor oil. A further object is a process for making these esters. Other objects will appear hereinafter.

These objects are accomplished by the following invention in which hydrogenated castor oil comprising essentially 12-hydroxy stearin is reacted with organic polycarboxylic acids in such proportion as to yield a product soluble in organic solvents, preferably a fluid or viscous oil at ordinary temperature.

Castor oil consists chiefly (about 85%) of glyceryl triricinoleate which may be expressed by the following formula:

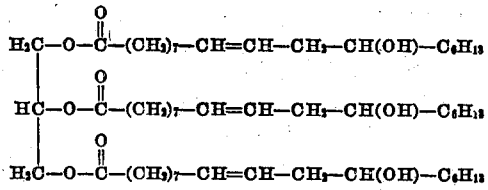

Glyceryl triricinoleate

Ordinary castor oil is used extensively in nitrocellulose coatings and plastics. However, castor oil turns rancid because of oxidation which occurs at the ethylenic double bonds of the glyceryl triricinoleate. When such rancidification occurs, a brittleness of the pyroxylin film softened with castor oil develops. Removal of the double bonds by hydrogenation, which may be effected in the known manner by using a nickel catalyst below 200° C., converts the glyceryl triricinoleate to 12-hydroxy stearin, a compound having the following formula:

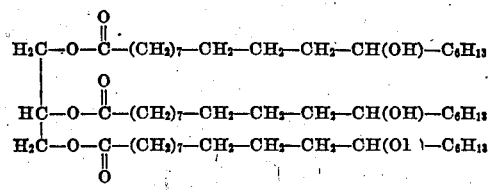

12-Hydroxy stearin

This product, however, is a hard white wax melting at 86° C. and incompatible with nitrocellulose. It cannot therefore, without further modification, be used as a film softening agent. This material still contains the hydroxyl groups originally present in the ricinoleic acid molecule, and I have discovered that when these hydroxyl groups are esterified with organic polycarboxylic acids, as described herein, liquid to resinous products result which are readily compatible with nitrocellulose.

I have found that very valuable softening agents for nitrocellulose films may be obtained by esterifying hydrogenated castor oil, which consists essentially of 12-hydroxy stearin with aromatic or aliphatic dicarboxylic acids in particular, as exemplified by the following examples.

By the term "hydrogenated castor oil" as used in the present specification and claims, is meant that type of hydrogenated product wherein the ester linkages and hydroxyl groups are unaffected and the ethylenic double bonds are hydrogenated, said product consisting essentially of 12-hydroxy stearin.

Example I

A mixture of 700 parts of hydrogenated castor oil and 144 parts of phthalic anhydride is heated with or without blowing or stirring at 225° C. for 7½ hours, or until the acid number has reached a value of, roughly, 10.0. The final product is a light brown moderately viscous oil. It may be used as such in coating compositions without further purification.

Example II

A mixture of 700 parts of hydrogenated castor oil and 115 parts of succinic acid is heated with or without stirring or blowing at 225° C. for 8½ hours, or until the acid number has reached a value of, roughly, 25.0. The product is a very viscous liquid. It may be used as such without further purification.

In like manner the esterification may be conducted with polycarboxylic acids other than those mentioned in Examples I and II. Other examples of suitable polycarboxylic aromatic acids are trimesic, salicyl-acetic, chlorophthalic, trimellitic, naphthalic, quinolinic, and diphenic acids. Further examples of other suitable aliphatic polycarboxylic acids are citric, tartaric, fumaric, dilactylic, tricarballylic, and sebacic acids. In general, all polycarboxylic acids whether aliphatic, aromatic, or heterocyclic may be used. I desire it to be understood that the term "polycarboxylic acid" referred to in the claims includes either the acid or the anhydride thereof.

In certain cases the castor oil, during drastic hydrogenation, loses some of its hydroxyl groups and the resulting hydrogenated product contains stearin which is not affected by the esterification processes as illustrated above. The stearin is presumably formed by dehydration and subsequent hydrogenation of the ethylenic double bond which is formed. If a considerable amount of stearin is present in the hydrogenation product, it will separate unchanged in the final hydrogenated castor oil ester as a white solid. Any stearin which separates from the oily reaction product claimed herein may be removed by filtration through filter cloth where the reaction product is of low viscosity. Where this product is of high viscosity, it may be thinned with a solvent, e. g., acetone, in which the reaction product is soluble and the stearin is practically insoluble. The latter can then readily be removed by filtration and the filtrate heated at 100° C. in vacuo for about two hours to remove the solvent.

Although these esters are most conveniently prepared by heating the hydrogenated castor oil with the acid, any of the well known methods of esterification may be used, as for instance by reacting the hydrogenated castor oil with an acyl halide or an acid anhydride. Furthermore, the hydrogenated castor oil may be esterified with mixtures of different polycarboxylic acids, or with mixtures of mono and polybasic acids. The esterification may be carried out in the presence of a nonreactive solvent, as in my co-pending application Serial No. 425,585 filed January 17, 1930. In general the reaction may be carried out at temperatures between 150° and 275° C. but it is preferred to operate at 210–250° C. Furthermore these esters can be prepared by the hydrogenation of polycarboxylic acid esters of castor oil which may be done in solution, e. g. in "Decalin", if necessary.

A typical example of a nitrocellulose composition containing my improved softeners and suitable for use in coating fabrics for the preparation of artificial leather is as follows:

Example III

| | Parts by weight |
|---|---|
| Nitrocellulose (10 seconds viscosity) | 1 |
| Phthalate of hydrogenated castor oil | 1½ |
| Pigment | 1 |
| Solvent | 4.25 |

A lacquer for wood, metal, etc. is as follows:

Example IV

| | Parts by weight |
|---|---|
| Nitrocellulose (½ second viscosity) | 12 |
| Damar gum | 3 |
| Dibutyl phthalate | 4 |
| Phthalate of hydrogenated castor oil | 2.6 |
| Solvent | 150 |

In these examples the softening agent indicated may be replaced with other polycarboxylic acid esters of hydrogenated castor oil, such as the succinate of Example II.

For use as softeners in films for artificial leather coatings, the esters of aliphatic polycarboxylic acids produce films having relatively high exudation temperatures. While the softening agents produced from the aromatic polycarboxylic acids do not yield films having as high an exudation temperature as those produced with aliphatic acids, the aromatic acids do, however, produce softening agents which, because of their higher viscosity, lend toughness to the nitrocellulose film. The viscosity and consequent toughening property increases in general with the number of carboxyl groups, the tricarboxylic acids, for example, being more effective in this respect than the dicarboxylic acids. In nitrocellulose coatings for artificial leather increase in viscosity is, however, undesirable beyond a certain point and the dicarboxylic acids as esterifying agents are preferred as a rule.

Mixtures of the various softening agents can be used and different ratios of softener, pyroxylin, pigment and gum may be used in the coating compositions as will be readily understood by those skilled in the art.

The present invention finds its most important use in the preparation of such compositions as are used in the coating of fabrics for the production of artificial leather.

As softeners in less flexible lacquers and enamels such as those used on metal or wood surfaces, etc., I may use the more viscous products, or certain of the esters not so desirable in artificial leather coatings. Obviously, many other uses will suggest themselves to those skilled in the art, such as adhesives, lubricants, fluids for hydaulic shock absorbers, and impregnating agents for paper, fabric and other porous materials.

In many cases it will be found that esterification with polycarboxylic acids, if carried too far, will produce gelled or insoluble products; these are unsuitable for the purposes of the present invention. The gelation can be avoided by heating at a lower temperature for a shorter period of time, or by including monohydric alcohols and/or monocarboxylic acids as additional reaction components.

Films flowed from nitrocellulose coating compositions containing my improved softening agents have been found to withstand, after aging, either the same number of bends, or a greater number than they would initially and no rancidity development could be detected after aging. In certain of these softeners greater toughness and a higher exudation temperature is imparted to the pyroxylin film. The exudation temperature of the film is as great as, and is usually greater than, one in which castor oil is the softener.

Although the use of my new esters has been described with particular reference to nitrocellulose, other cellulose derivatives such as the acetate, propionate, aceto-butyrate, the ethyl or benzyl ethers, etc., may be used with these new products in coating, plastic, impregnating, or adhesive compositions.

As many apparently widely different embodiments of this invention may be made without departing from the spirit and scope thereof, it is to be understood that I do not limit myself to the specific embodiments thereof except as defined in the following claims:

I claim:

1. The oily reaction product of polycarboxylic acid and hydrogenated castor oil consisting essentially of hydroxy stearin.

2. The oily reaction product of dicarboxylic acid and hydrogenated castor oil consisting essentially of hydroxy stearin.

3. The oily reaction product of aromatic polycarboxylic acid and hydrogenated castor oil consisting essentially of hydroxy stearin.

4. The oily reaction product of aromatic dicarboxylic acid and hydrogenated castor oil consisting essentially of hydroxy stearin.

5. The oily reaction product of phthalic acid and hydrogenated castor oil consisting essentially of hydroxy stearin.

6. The oily reaction product of aliphatic polycarboxylic acid and hydrogenated castor oil consisting essentially of hydroxy stearin.

7. The oily reaction product of aliphatic dicarboxylic acid and hydrogenated castor oil consisting essentially of hydroxy stearin.

8. The oily reaction product of succinic acid and hydrogenated castor oil consisting essentially of hydroxy stearin.

9. A process for manufacturing a product soluble in organic solvents which comprises esterifying hydrogenated castor oil, in the absence of substantial amount of free polyhydric alcohol, with a polycarboxylic acid, said hydrogenated castor oil consisting essentially of hydroxy stearin.

MERLIN MARTIN BRUBAKER.